Jan. 27, 1959
A. F. KENYON
2,871,435
EXCITATION OF DYNAMO-ELECTRIC MACHINES
Filed Feb. 8, 1954
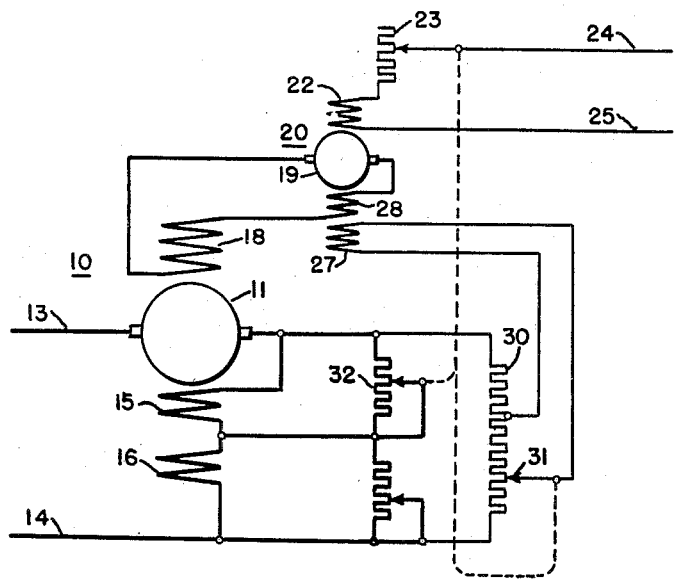
WITNESSES:
Leon J. Jaja
G. V. Giolma
INVENTOR
Alonzo F. Kenyon
BY
Paul E. Friedemann
ATTORNEY

United States Patent Office 2,871,435
Patented Jan. 27, 1959

2,871,435

EXCITATION OF DYNAMO-ELECTRIC MACHINES

Alonzo F. Kenyon, Pittsburgh, Pa., assignor to Westinghouse Electric Corporation, East Pittsburgh, Pa., a corporation of Pennsylvania Application February 8, 1954, Serial No. 408,917

2 Claims. (Cl. 318—308)

My invention relates, generally, to dynamoelectric machines and it refers, in particular, to excitation systems for electric motors.

Generally stated, it is an object of my invention to provide in a simple and effective manner information effecting compound excitation of a dynamo-electric machine and exciter therefor.

More specifically, it is an object of my invention to provide for compounding a dynamo-electric machine by utilizing an auxiliary winding on an exciter energizing a separate field winding of the machine, the field winding of the exciter being energized in accordance with an armature current of the machine.

It is also an object of my invention to provide for utilizing a differentially compounded exciter having an auxiliary field winding energized in accordance with the current of the dynamo-electric machine for adjusting the compounding of the machine.

It is a further object of my invention to provide for compounding the excitation of a large direct current motor by using a potentiometer rheostat for adjusting the excitation of an auxiliary field winding on the exciter to obtain different effects therefrom in accordance with the armature current of the motor.

Yet another object of my invention is to provide for connecting an auxiliary field winding on an exciter for a direct current motor to be energized through a potentiometer rheostat in accordance with the armature current of the motor so that the excitation may be continuously adjusted from a cumulative value through zero to a differential value.

Other objects of my invention will be made more obvious, and will in part be described hereinafter.

In practicing my invention, in accordance with one of its embodiments, the compounding of a large hot strip mill direct current motor having series commutating and compensating field windings, as well as cumulative field series windings, may be varied by providing an auxiliary field winding on the forcing exciter, which provides the excitation for the motor main field winding, and itself has a main separately excited field winding. The auxiliary field winding is connected by a potentiometer rheostat across the series field windings of the motor so that the excitation may be varied to change the motor compounding from a cumulative value through zero to a differential value.

For a more complete understanding of the nature and scope of my invention, reference may be made to the following detailed description, which may be read in connection with the accompanying drawing, in which the single figure is a diagrammatic view of an excitation system for a direct current motor which embodies the invention in one of its forms.

Referring to the single figure of the drawing, the reference numeral 10 may denote generally a large direct current mill motor having an armature 11 connected to a suitable source of direct current by conductors 13 and 14. The motor may be provided with series compensating and commutating field windings 15, as well as a cumulative series field winding 16, connected in circuit with the armature and the source. The main field winding 18 is connected to the armature 19 of forcing exciter 20 which provides the principal excitation for the mill motor.

In order to provide for varying the compounding of the motor 10, the exciter 20, which may, as is well known in the art, be driven at a substantially constant speed, as by a shunt motor or the like (not shown), and has a main field winding 22 connected to a suitable source of excitation by conductors 24 and 25, is provided with an auxiliary winding 27 in addition to a differential series winding 28, which provides quick response and forcing of the excitation of the motor 10, following any change in excitation of either the main field winding 22 or the compounding field winding 27. The auxiliary field winding 27 is connected by a potentiometer rheostat 30 having an adjustable contact 31, across the series windings 15 and 16 so that the series excitation of the forcing exciter may be varied from a cumulative value to a differential value by moving the contact 31.

Since, in some cases, adjustment of the motor series excitation will be desired to obtain a flat speed regulation throughout the range of speed adjustment by shunt field control, the exciter main field rheostat 23 is operatively connected to the potentiometer rheostat 30 so that the series excitation and shunt excitation are varied simultaneously. This connection can be omitted where separate operation of the rheostats to obtain particular operating characteristics is desired. For good commutation, it may be desirable to shunt the commutating field winding 15 with a rheostat 32 so as to vary the effect thereof. The rheostat 32 may also be operatively connected to the rheostat 23 for simultaneous operation, though this connection may be omitted if desired.

By utilizing the features of my invention, not only may the compounding of a machine already having a series field winding be accurately varied by utilizing compound excitation of the exciter for the main field winding, but large motors without any series field winding may be satisfactorily compounded, either cumulatively or differentially, by using compound excitation of the motor exciter according to my invention. By this arrangement, motors in operation may readily have their operating characteristics changed without the expensive redesign of the windings thereof, and compounding may be readily provided on motors which may not have sufficient space for adding series windings thereto. It will be seen that the expense and labor of modifying large mill motors which are already in operation, may be greatly reduced by providing the compounding effect through the medium of the exciter. The exciter is preferably operated on the straight-line portion of the saturation curve, so that changes in armature current will produce proportional changes in exciter output. By using a differential field on the exciter, changes in motor current or changes in position on the rheostats 23 and 30 are quickly reflected in a change of main motor excitation.

Since certain changes may be made in the above construction and different embodiments of the invention may be made without departing from the spirit and scope thereof, it is intended that all the matter contained in the above description and shown in the accompanying drawing shall be interpreted as illustrative and not in a limiting sense.

I claim as my invention:

1. In combination, a motor having an armature with cumulative commutating and series field windings, and a separate main field winding, an exciter having an armature connected in series with the main field winding and having a plurality of field windings, circuit means including a rheostat connecting one of said plurality of field windings to a separate source of substantially constant voltage, a rheostat shunting the commutating field windings operatively connected to the field winding rheostat, and means including a potentiometer rheostat for reversibly connecting another of said plurality of field windings for energization in accordance with the current through the commutating and series field windings.

2. In combination a motor having an armature with cumulative series field windings and a main separately excited field winding, a separately driven exciter having an armature connected in series circuit relation with said main field winding and having a plurality of field windings, a first circuit including a first rheostat member connecting one of said plurality of field windings to be energized by a separate source of excitation, an additional circuit including a plurality of rheostat members connecting another of said plurality of field windings to be energized in accordance with the motor armature current, and motor control means including said first rheostat and at least one of said plurality of rheostats, with said first rheostat and said one of said plurality of rheostats being operatively connected together for simultaneously varying the excitation of said one and said another field winding.

References Cited in the file of this patent

UNITED STATES PATENTS

| | | |
|---|---|---|
| 1,051,238 | Lamboef | Jan. 21, 1913 |
| 2,308,994 | Mickey | Jan. 19, 1943 |
| 2,470,672 | Wrathall | May 17, 1949 |
| 2,501,528 | Mandl | Mar. 21, 1950 |
| 2,516,038 | Wrathall | July 18, 1950 |